United States Patent [19]

Sato

[11] 4,017,902
[45] Apr. 12, 1977

[54] CASSETTE EJECTOR FOR TAPE RECORDER
[75] Inventor: Masaaki Sato, Hachioji, Japan
[73] Assignee: Olympus Optical Co., Ltd., Tokyo, Japan
[22] Filed: Oct. 3, 1975
[21] Appl. No.: 619,292
[30] Foreign Application Priority Data
Oct. 8, 1974 Japan .................... 49-115902
Oct. 8, 1974 Japan .................... 49-115903
[52] U.S. Cl. .......................... 360/137; 360/96
[51] Int. Cl.² ........................... G11B 23/04
[58] Field of Search ............ 360/93, 94, 95, 96, 360/105, 132, 137, 69

[56] References Cited
UNITED STATES PATENTS 3,747,941 7/1973 Van der Lely .................. 360/96
3,759,529 9/1973 Yoshii .............................. 360/96
3,810,242 5/1974 Ikeda .............................. 360/96
3,855,627 12/1974 Vettore ........................... 360/96
3,893,186 7/1975 Yoshii .............................. 360/96
3,902,681 9/1975 Boehme ........................... 360/96

Primary Examiner—Jay P. Lucas
Attorney, Agent, or Firm—Ostrolenk, Faber, Gerb & Soffen

[57] ABSTRACT

A cassette ejector for use in a tape recorder which uses a cassette utilizes a forward movement of a magnetic head and/or pinch roller into a window of a cassette when recording or playing back, to displace a cassette ejection member outside its operable region, thus making it incapable of an ejecting operation.

5 Claims, 7 Drawing Figures

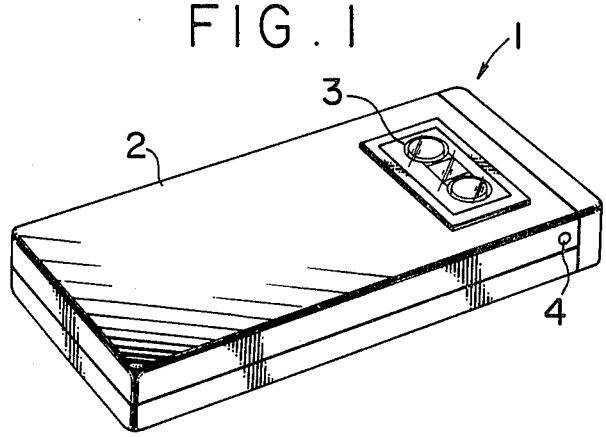
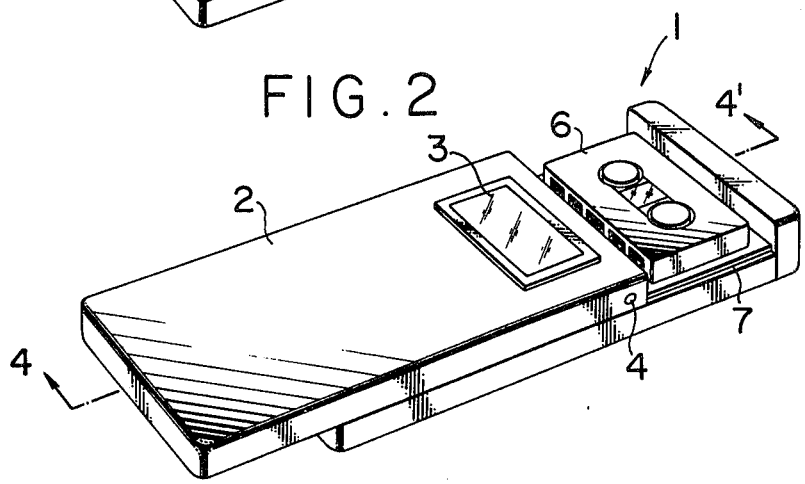
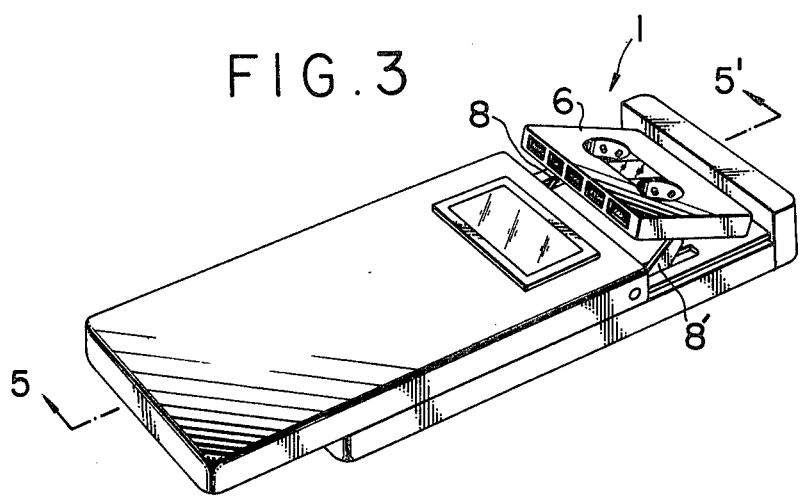

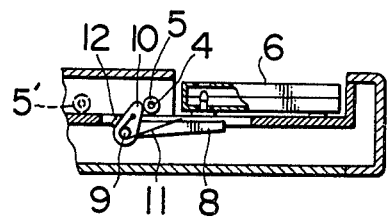
FIG. 4
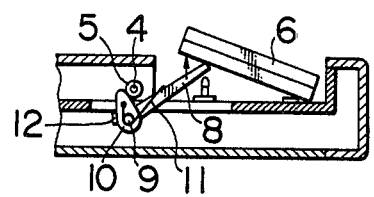
FIG. 5
FIG. 6
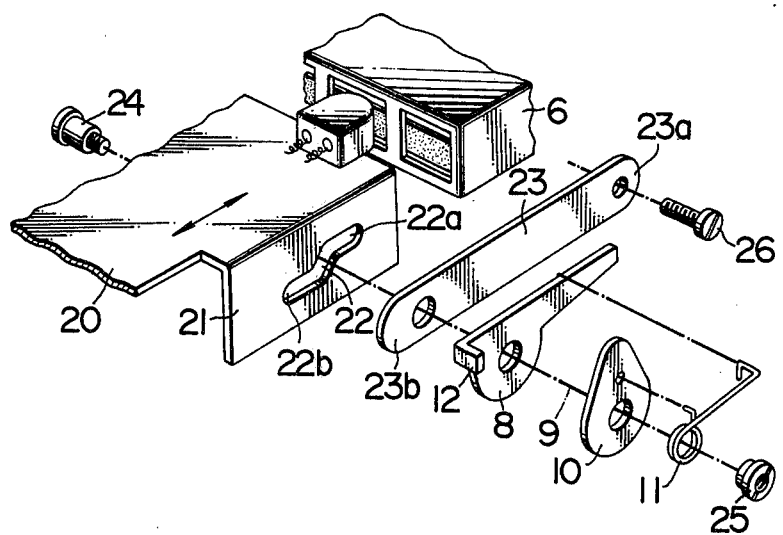
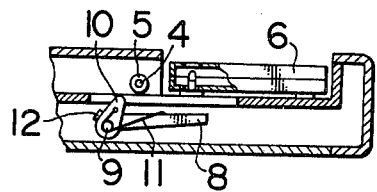
FIG. 7

CASSETTE EJECTOR FOR TAPE RECORDER

BACKGROUND OF THE INVENTION

The invention relates to a cassette ejector for tape recorders and the like.

It is known that if a cassette is ejected during a recording or play back operation of a tape recorder when a magnetic head and/or pinch roller has moved into a window formed in the cassette, the head or pinch roller may be damaged or the azimuth of the head may be misaligned. Most prior art cassette ejectors are, therefore, designed to permit cassette ejection of the cassette only after the head or pinch roller has moved to its inoperative position. Typically, the prior art cassette ejectors eject the cassette in response to the movement of a member associated with the recording or play back operation, to its operative position. Such structures are complex, necessitating high accuracy of the parts and a skilled and careful assembly, thus resulting in an expensive unit. Even when employing such prior art systems, it is difficult to completely avoid the above disadvantages in a reliable manner.

SUMMARY OF THE INVENTION

It is an object of the invention to provide a cassette ejector for tape recorders which ejector is simple in structure and reliably eliminates the above disadvantages by utilizing a movement of a magnetic head and/or pinch roller to its operative position to drive an actuating member of the cassette ejector such as an eject lever or actuating pawl to its inoperative position, thus making it incapable of performing an ejecting operation.

When the apparatus according to the invention is used in conjunction with a tape recorder having a slidable cassette cover, the actuating member of the cassette ejector can be moved to its inoperative position by a single action of sliding the cassette cover to open the cassette receiving space.

BRIEF DESCRIPTION OF THE DRAWINGS

FIG. 1 is a perspective view of a tape recorder having a slidable cassette cover in which the ejector according to the invention is incorporated;

FIG. 2 is a similar perspective view with the cassette cover being moved to expose a cassette loaded in place;

FIG. 3 is a similar perpective view with the cassette cover being further moved in the opening direction and with the cassette being ejected;

FIG. 4 is a cross section taken along the line 4—4' shown in FIG. 2;

FIG. 5 is a cross section taken along the line 5—5' shown in FIG. 3;

FIG. 6 is an exploded perspective view of a retraction mechanism which moves the actuating member of the ejector to its inoperative position; and FIG. 7 is a cross section of the actuating member in its retracted position.

DETAILED DESCRIPTION OF THE INVENTON

Referring to FIGS. 1 to 7, an embodiment of the invention as applied to a tape recorder having a slidable cassette cover which permits a cassette ejection in a single action of sliding the cassette cover will be described below. FIG. 1 generally shows a tape recorder having a slidable cassette cover to which the invention is applied. The recorder includes a body 1, a slidable cassette cover 2 and a cassette view window 3. A pivot 4 is shown mounted on the cover and carries an actuating roller 5 (see FIGS. 4 and 5) which represents an actuating member of the ejector.

FIG. 2 shows that the cassette cover 2 is slid from the condition illustrated in FIG. 1 to expose a loaded cassette 6. Numeral 7 represents a sliding channel formed in the body 1 for engagement with the cassette cover 2.

FIG. 3 shows a further sliding movement of the cassette cover 2 to permit an ejection of the cassette 6 by means of a pair of ejection levers 8, 8'.

Referring to FIGS. 4 and 5, it will be noted that the actuating roller 5 is mounted on the pivot 4 which is secured to the cassette cover 2. At its one end, an eject lever 8 is pivotally mounted on a pin 9 which is secured to the body 1 and an actuating pawl 10 is also pivotally mounted on the pin 9. The eject lever 8 and the pawl 10 are gently urged to move away from each other by a torsion spring 11 which is disposed around the pin 9, but the resulting movement of the pawl 10 is resisted by a detent 12 formed on one end of the eject lever 8.

In operation, the cassette cover 2 is slid to the left along the sliding channel 7 from the condition shown in FIG. 1 to reach the position shown in FIG. 2, whereupon the actuating roller 5 bears against the pawl 10 at its upper right-hand end. Under this condition, the eject lever 8 has no action, but as the cassette cover 2 is further moved in the same direction, the roller 5 bears against the pawl 10 with an increased force, which pawl is therefore caused to rotate counter-clockwise about the pin 9. As a result of the unitary connection between the pawl 10 and the eject lever 8 provided by the detent 12 and the spring 11, the eject lever 8 is also rotated counter-clockwise about the pin 9, whereby the free end thereof pushes up the bottom of the cassette 6 to eject it, as shown in FIG. 5. Thus, the cassette 6 can be easily removed.

As the cassette cover 2 is further moved, the roller 5 can freely pass over the pawl 10 to permit a removal of the cassette cover ince the upper end of the pawl 10 has rotated away from the path of the roller 5. When inserting the cassette, its bottom presses down the eject lever 8 to the positon shown in FIG. 4, and as the cassette cover 2 is moved in the closing direction, the roller 5 will move from a position such as shown at 5' in broken lines in FIG. 4 to the right, bearing against the pawl 10 at its upper left-hand end. However, the pawl 10 is yieldably urged in the counter-clockwise direction by the torsion spring at a reduced spring rate, so that the cassette cover 2 can be moved past the pawl 10 by rotating it clockwise about the pin 9. Simutaneously, the eject lever 8 which is connected therewith by the torsion spring 11 is pressed downward to the position shown in FIG. 4, so that the cassette cover can be closed to the position shown in FIG. 1 even when a cassette 6 is not inserted. In this manner, a sliding movement of the cassette cover 2 assures an ejection of the cassette 6.

It is necessary to prevent an actuation of the ejector in response to a movement of the cassette cover during a recording or play back operation of the tape recorder. In particular, with a tape recorder of the tape in which a magnetic head or pinch roller is moved into a window formed in the cassette, an actuation of the ejector during a recording or play back operation will cause damage to ejection members or the cassette and also causes a misalignment of the azimuth of the head. In accordance with the invention, a movement of a sliding plate on which a magnetic head and/or pinch roller is mounted toward a tape run located in the cassette 6 is utilized to move the ejector to an inoperative positon where it is freed from an opening or closing movement of the cassette cover 2. Referring to FIG. 6, there is shown a sliding plate 20 on which a magnetic head and/or pinch roller is mounted. The sliding plate 20 is formed with an extension which is folded at right angles to the plane thereof and which is formed with an elongate stepped cam slot 22. A rocking lever 23 has its one end 23a rotatably mounted on the body 1, and a rocking shaft 24 extends through an opening formed in the other end 23b of the rocking lever. The rocking shaft 24 corresponds in function to the pin 9 previously mentioned on which the eject lever 8 and the pawl 10 are pivotally mounted, and carries these members on its extension beyond the rocking lever 23. One end 23a of the rocking lever 23 is pivotally mounted on a stud 26 to permit a rocking motion of the rocking lever 23 thereabout in a vertical plane as the rocking shaft 24 moves within the cam slot 22. A nut 25 engages the end of the rocking shaft 24 which extends beyond the pawl 10.

In operation, it is necessary to move a magnetic head and pinch roller into abutting engagement with the tape surface by inserting them into respective windows formed in the tape cassette 6 during a recording or play back operation of the tape recorder. Such movement is achieved by moving the sliding plate 20. As the sliding plate 20 is moved to the right, as viewed in FIG. 6, the extension 21 simultaneously moves in the same direction. Since a rocking motion of the rocking shaft 24 is only permitted in a vertical plane, it is moved from an upper region 22a to a lower region 22b of the cam slot 22, as the extension 21 moves, thus rocking the lever 23 counter-clockwise about the pin 26 through a small angle. When the sliding plate 20 reaches either recording or play back position, the rocking shaft 24 will be situated at the end of the lower region 22b of the cam slot 22. As the rocking lever 23 moves downward, the eject lever 8 and the pawl 10 pivotally mounted thereon are also lowered in position to be retracted from the path of the actuating roller 5 (see FIGS. 4 and 5) which it travels as the cassette cover 2 is opened or closed. Such position is shown in FIG. 7, and in this position, the eject lever 8 and the pawl 10 are isolated from the influence of an opening and closing movement of the cassette cover 2, thus preventing an actuation of the ejector during a recording or play back operation of the tape recorder.

When the sliding plate 20 is moved to the left, as viewed in FIG. 6, after the completion of a recording or play back operation of the tape recorder, the rocking shaft 24 moves from the lower region 22b to the upper region 22a of the cam slot 22, rocking the rocking lever 23 clockwise about the pin 26, whereby the eject lever 8 and the pawl 10 mounted on the rocking shaft 24 are moved upwardly, placing the top end of the pawl 10 in the path of movement of the actuating roller 5. As a result, an opening movement of the cassette cover 2 causes the cassette 6 to be ejected by an operation mentioned previously.

In this manner, the retraction of the cassette ejector to its inoperative position where it is free from the influence of the opening or closing of the cassette cover in response to a movement of a member which is associated with either recording or play back operation of the tape recorder prevents damages to the ejecting members or pinch roller or a misalignment in the azimuth of the head even when an ejecting operation is inadvertently attempted during a recording or play back operation.

While an embodiment of the invention as applied to a tape recorder having a slidable cassette cover which is opened to eject a cassette has been described, it should be understood that the invention can be equally applied to an alternative form of tape recorder having an eject button externally mounted on the casing of the recorder and which can be operated to slide a lever for the purpose of an ejecting operation. In this instance, the actuating roller 5 can be mounted on the lever. Since no further movement beyond the ejection position can occur in this arrangement as occurs with the slidable cassette cover, the eject lever 8 and the pawl 10 can be made integral.

What is claimed is:
1. A cassette ejector for use with a cassette tape recorder having a slidable cassette cover movable from a closed to an open position, comprising:
    a sliding plate which carries at least one member associated with a recording or play back operation of the tape recorder, the sliding plate being movable from an operative position wherein the at least one member associated with a recording or play back operation is in operative contact with the cassette to an inoperative position wherein the at least one member associated with a recording or play back operation is out of operative contact with the cassette, the sliding plate being movable into the operative position when the slidable cassette cover is moved into the closed position and movable into the inoperative position when the slidable cassette cover is moved into the open position;
    an actuating roller mounted on the slidable cassette cover for movement with the slidable cassette cover;
    an operating pawl and an eject lever pivotally mounted on the sliding plate about a single axis, the operating pawl being movable from a first position wherein the operating pawl is positioned in the path of movement of the activating roller to a second position wherein the operating pawl is removed from the path of movement of the activating roller;
    means for causing the eject lever to rotate with the operating pawl and to cause an ejecting operation of the cassette when the operating pawl is engaged by the actuating roller when the slidable cassette cover is being moved from the closed to the open position;
    means for removing the operating pawl from the path of movement of the actuating roller when the sliding plate is in the operative position, thereby preventing an ejecting operating when the sliding plate is in the operative position.

2. A cassette ejector in accordance with claim 1 wherein the means for causing the eject lever to rotate with the operating pawl comprises a detent formed on the eject lever which is engaged by the operating pawl when the operating pawl is caused to rotate by the action of the actuating roller.

3. A cassette ejector in accordance with claim 1 wherein the means for removing the operating pawl from the path of movement of the actuating roller comprises:

an extension in the sliding plate extending in a plane perpendicular to the path of movement of the cassette cover, the extension including a cam slot therein;

a rocking lever pivotally mounted at one end on the body of the tape recorder and at the other end on a shaft extending through the cam slot in the extension of the sliding plate, the operating pawl and eject lever being mounted on the shaft;

the cam slot including a pair of upper and lower regions which extend in a path parallel to the path of movement of the sliding plate which are interconnected by an intermediate inclined region.

4. Apparatus for preventing erroneous ejection of a cassette in a cassette type tape recorder, said recorder having:

a recess for receiving a cassette;

first means movable between a first and second position for respectively uncovering and covering said recess;

second means responsive to movement of said first means from said first to said second position for ejecting a cassette;

a record/playback assembly;

third means movable between a first and second position for respectively moving said assembly into an engaged and a disengaged position with the cassette, said third means including means for displacing said second means out of the path of movement of said first means when said third means is in the first position to prevent the accidental occurrence of a cassette ejection operation.

5. A cassette ejector for use with a cassette tape recorder, comprising a rocking lever which is pivotally mounted at one end on a body of the tape recorder; a rocking shaft carried by the other end of the rocking lever and extending in a direction perpendicular to the axis thereof; a cam slot formed in a sliding plate which carries at least one member associated with a recording or play back operation of the tape recorder, the rocking shaft freely extending through the cam slot; an eject lever pivotally mounted on the rocking shaft and having its one end located opposite to the bottom of a cassette which is loaded into the tape recorder, the eject lever including an engaging portion; and an actuating member mounted on the body of the tape recorder for urging the engaging portion of the eject lever, a movement of the sliding plate to its recording or play back position being effective to rock the rocking shaft, whereby the engaging portion of the eject lever is retracted from the path of movement of the actuating member, thus preventing an ejecting operation by the eject lever during a recording or play back operation of the tape recorder.

* * * * *